Patented July 21, 1942

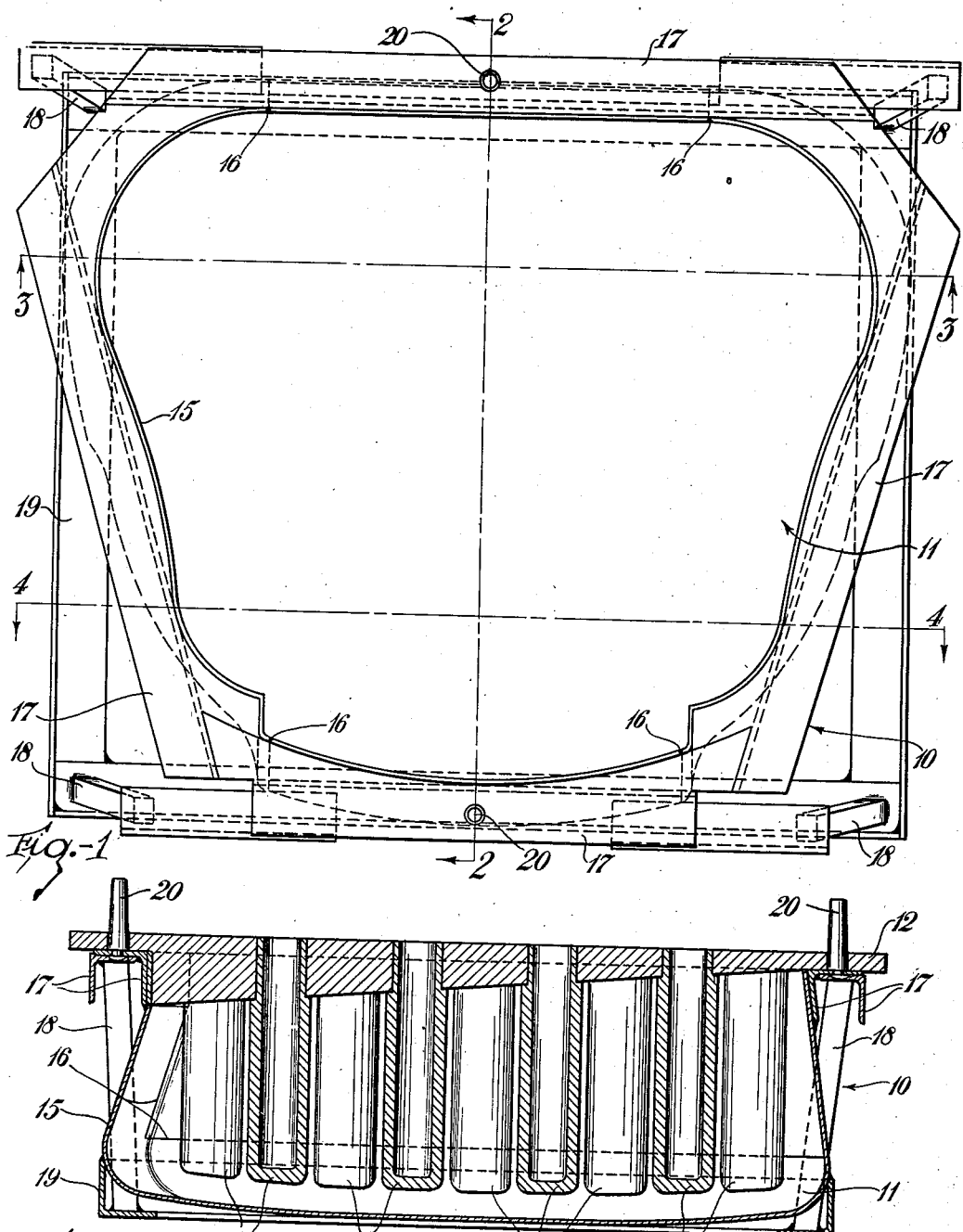

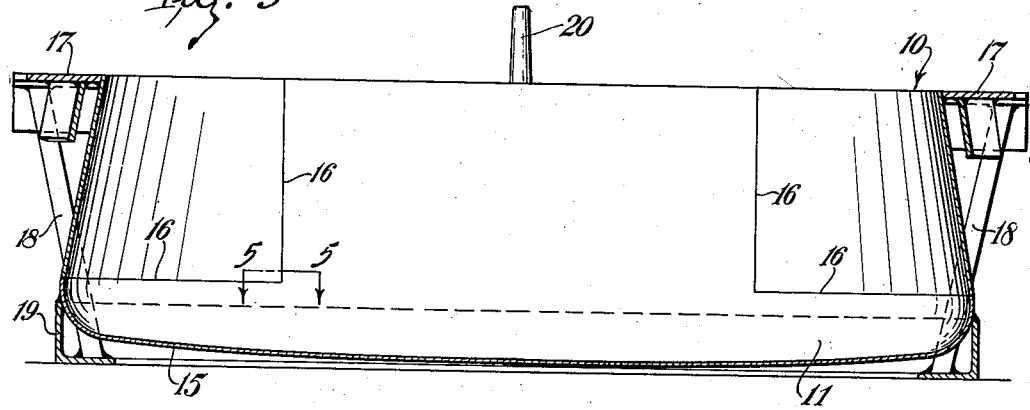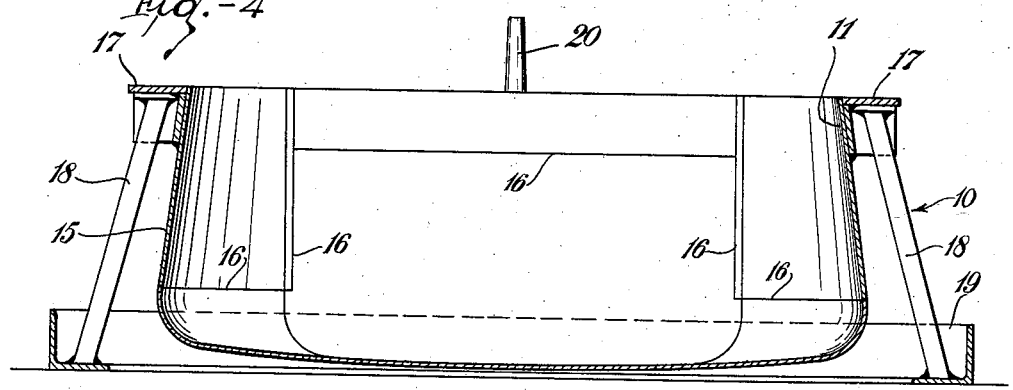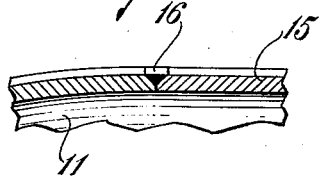

2,290,612

UNITED STATES PATENT OFFICE 2,290,612

MOLD FOR RUBBER PRODUCTS

Ellwood F. Riesing, Walter J. Daugherty, and Alan E. Rathbun, Akron, Ohio, assignors to The Firestone Tire & Rubber Company, Akron, Ohio, a corporation of Ohio Application February 3, 1938, Serial No. 188,476

1 Claim. (Cl. 18—39)

This invention relates to molds for rubber products, and more especially it relates to molds in which fluent rubber composition, such as compounded rubber latex, may be coagulated, shaped, and vulcanized.

Molds for the vulcanizing of products of masticated rubber composition usually are of cast metal, such as cast iron, for the reason that the composition requires to be put under relatively high pressure to cause it to conform to the shape of the molding cavity. Since rubber latex is fluent, the application of pressure thereto during vulcanization is not required. But use of iron and steel for latex molds has presented a problem, namely, the prevention of corrosion or pitting of the molds by the constituents of the compounded latex, and for this reason molds for latex products heretofore have usually been made of porcelain. Molds of porcelain are more or less fragile, their initial cost is high, and it is impossible to alter the shape of the finished mold.

The chief objects of this invention are to provide an improved metal mold for latex products; to provide latex-vulcanizing molds that may be produced in less time than cast metal molds; that will be cheaper in cost than cast metal molds; that will be lighter in weight than cast metal molds; to provide molds that are less susceptible to breakage than cast metal or porcelain molds; to provide molds of reduced weight, thus facilitating the handling thereof; to provide molds of the character mentioned that readily may be altered in shape, within certain limits; to provide molds of greater thermal conductivity, thus reducing the time required for the vulcanization of articles; and to provide a mold of uniform thermal conductivity throughout, thereby assuring uniformity of vulcanization throughout the product. Other objects will be manifest as the specification proceeds.

Of the accompanying drawings:

Figure 1 is a plan view of a mold embodying the invention, in its preferred form, the cover thereof being removed;

Figure 2 is a section thereof on the line 2—2, showing the cover in molding position thereon;

Figure 3 is a section on the line 3—3 of Figure 1;

Figure 4 is a section on the line 4—4 of Figure 1; and

Figure 5 is a section on the line 5—5 of Figure 3.

Referring to the drawings, there is shown a single-cavity mold particularly designed for the manufacture of seat cushions. The mold is a two part structure, and comprises a base section 10 that includes a molding cavity 11, and a cover 12 that includes a multiplicity of projecting mandrels or fingers 13, 13, the latter extending into the cavity 11, in the closed or operative condition of the mold, for forming recesses in the rubber product to increase the resilience thereof. The bottom surface of the cover 12 gradually increases in thickness from one side thereof towards the opposed side (see Figure 2) whereby a product which varies in thickness can be prepared in the mold. The mandrels 13 are hollow, and are open to the top face of the cover 12 so that heated fluid may enter them and thus expedite the vulcanization of the material confined in the mold. The product is made from compounded rubber latex that is frothed or aerated before being poured into the cavity 11 of the mold.

The cavity 11 is defined by a sheet metal shell 15 that is made up of a plurality of sections that are welded together at butt seams 16, 16, the welding metal being applied to the outer surface of the shell, as shown in Figure 5, so that the cavity 11 has a smooth surface throughout. The upper, open margin of the shell 15 is reinforced by means of lengths of angle iron 17, 17 that are welded thereto, exteriorly of the molding cavity. The shell is supported at a slightly elevated position by a plurality of metal posts 18, 18 that have their upper ends welded to the reinforcing angles 17, and have their lower ends welded to a rectangular frame 19 constructed of angle iron. Said frame may be welded to the shell 15 at such points as they are in contact, as shown in Figure 2 and Figure 3. The base section 10 has a pair of upwardly projecting dowels 20, 20 secured to the reinforcing angles 17, at opposite sides of the cavity 11, said dowels registering with suitable apertures formed in the cover 12 for positioning the latter properly upon the base section.

The shell 15 is composed of 12 gauge sheet metal, which metal preferably is aluminum because of its greater thermal conductivity, its easy workability, because of its ductility and lack of resilience, and because of its resistance to corrosion from the constituents of compounded rubber latex. The shell may, however, be made of sheet iron or sheet steel, in which case it is necessary to apply a protective coating to the face of the molding cavity 11 to prevent pitting and corrosion thereof. For this purpose it has been found that resins in general give satisfactory results, superior results being obtained by use of a resin marketed under the trade name "Tornosite."

The improved mold is especially adapted for rapid and efficient vulcanization of latex rubber products. The uniform thickness of the shell 15 together with its superior thermal conductivity assure rapid and uniform heat transfer to the material being vulcanized. The provision of the hollow, open mandrels 13, and the feature of supporting the mold at an elevated position, permits the vulcanizing medium, usually hot water, to make contact with a large surface area of the mold, whereby the possibility of under-cured regions in the finished product is rendered unlikely.

The unit cost of the improved molds is less than the cost of cast metal molds unless the latter are produced in substantial quantities. The molds are of light weight, which facilitates handling thereof, and renders them less likely to be broken. Dents or other deformations of the mold shell may be easily hammered out. The shape of the shell may be altered if desired, and inserts may be welded in the cavity thereof. Thus the mold has a greater range of utility than molds of porcelain or cast metal.

Modification may be resorted to without departing from the spirit of the invention, or the scope thereof as defined by the appended claim.

What is claimed is:

A sectional vulcanizing mold for rubber products, said mold comprising a base section formed with a molding cavity, and a cover for said cavity, said cover carrying a hollow mandrel that extends into said cavity and has its interior open to the exterior of the mold whereby vulcanizing fluid may enter the mandrel, said cover increasing in thickness from one margin thereof towards the opposed margin whereby a product varying in thickness from side to side can be prepared in said mold.

ELLWOOD F. RIESING.
WALTER J. DAUGHERTY.
ALAN E. RATHBUN.